(12) United States Patent
Amin et al.

(10) Patent No.: US 11,206,206 B2
(45) Date of Patent: Dec. 21, 2021

(54) CONTAINER ROUTING ALGORITHM USING OSPF

(71) Applicant: T-Mobile USA, Inc., Bellevue, WA (US)

(72) Inventors: Rahul Amin, Issaquah, WA (US); Tingchun Kang, Redmond, WA (US); Henry Barrion, Renton, WA (US); Rex Maristela, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 185 days.

(21) Appl. No.: 16/697,109

(22) Filed: Nov. 26, 2019

(65) Prior Publication Data

US 2021/0160166 A1 May 27, 2021

(51) Int. Cl.
*H04L 12/733* (2013.01)
*H04L 12/741* (2013.01)

(52) U.S. Cl.
CPC .......... *H04L 45/122* (2013.01); *H04L 45/745* (2013.01); *H04L 2212/00* (2013.01)

(58) Field of Classification Search
CPC .................................................. H04L 45/122
See application file for complete search history.

(56) References Cited

U.S. PATENT DOCUMENTS

| 7,853,643 | B1* | 12/2010 | Martinez | H04L 69/22 |
| | | | | 709/203 |
| 9,049,098 | B2* | 6/2015 | Guichard | H04L 45/02 |
| 2013/0250803 | A1* | 9/2013 | Abraham | H04L 67/16 |
| | | | | 370/254 |
| 2020/0177503 | A1* | 6/2020 | Hooda | H04L 12/66 |
| 2020/0177629 | A1* | 6/2020 | Hooda | H04L 47/746 |
| 2021/0112034 | A1* | 4/2021 | Sundararajan | H04L 41/0823 |

* cited by examiner

*Primary Examiner* — Edan Orgad
*Assistant Examiner* — Won Tae C Kim
(74) *Attorney, Agent, or Firm* — Perkins Coie LLP

(57) ABSTRACT

Systems and methods for establishing routing information between software containers or other virtualized environments within a network, and providing inter-container routing between the software services operating on the network, are disclosed herein. The system utilizes an existing routing protocol such as Open Shortest Path First (OSPF) and establishes an overlay network that provides end-to-end connectivity between services of a customer operating in an Infrastructure as a Service (IaaS) network, while maintaining isolation from the traffic of other customers of the IaaS network. The system uses OSPF to learn aspects of the routes between containers in the network, and further builds a customer-specific overlay network based on IP-to-IP encapsulation of the OSPF messages.

20 Claims, 10 Drawing Sheets

800a

| IP-to-IP Encapsulation Routing Table ||||
| OSPF Area 802 | Container IP Space 804 | RID 806 | NIP 808 |
| 10 | <null> | 172.16.1.101 | <null> |

810 → (under OSPF Area/Container IP Space columns)    812 → (under RID column)

| IP-to-IP Encapsulation Routing Table ||||
| OSPF Area | Container IP Space | RID | NIP |
| 10 | 10.1.0.0/16 | 172.16.1.101 | <null> |

| IP-to-IP Encapsulation Routing Table ||||
| OSPF Area | Container IP Space | RID | NIP |
| 10 | 10.1.0.0/16 | 172.16.1.101 | DR PHY IP |

| IP-to-IP Encapsulation Routing Table | | | |
|---|---|---|---|
| OSPF Area | Container IP Space | RID | NIP |
| 10 | 10.1.0.0/16 | 172.16.1.101 | 1.1.1.1 |
| 10 | 10.2.0.0/16 | 172.16.1.102 | 2.2.2.2 |
| 10 | 10.3.0.0/16 | 172.16.1.103 | 2.2.2.3 |
| 14 | 10.1.0.0/16 | 172.16.0.4 | 1.1.1.1 |
| 14 | 10.11.0.0/16 | 172.16.0.11 | 21.4.4.4 |
| 14 | 10.20.0.0/16 | 172.16.0.20 | 21.4.4.49 |
| 15 | 10.1.0.0/16 | 172.16.0.1 | 28.1.2.3.4 |

902 { rows 1-3 }
904 { rows 4-6 }
906 { row 7 }

*FIG. 9*

CONTAINER ROUTING ALGORITHM USING OSPF

BACKGROUND

Infrastructure as a Service (IaaS) networks provide customers with compute capabilities, while abstracting away the underlying computing, storage, networking, and other physical resources that provide those capabilities. Typically, the physical resources used to provide services to a single customer are physically distributed across multiple locations and cloud datacenters. For example, a customer application may be running on a physical node in one datacenter, while another application for the same customer may be running on a different physical node in a different datacenter. Despite the physical distribution of underlying physical resources, the applications and services of a customer need to be able to efficiently and securely communicate with one another. Furthermore, it is essential that the communications for one customer over an IaaS network be isolated from the communications of another customer over the IaaS network.

In other words, it is desirable for an IaaS network to provide end-to-end connectivity between customer applications and services over the entire deployment of the IaaS network, while isolating the network traffic and IP space of each customer served by the network. There exist some solutions that are appropriate for certain types of networking requirements, but do not offer scalability or extensibility. Thus there is a need for system and methods that overcome these problems and provide additional benefits.

BRIEF DESCRIPTION OF THE DRAWINGS

FIGS. 8A-8C illustrates a partial IP-to-IP routing table, generated based on various message sequences according to various implementations.

FIG. 9 illustrates an IP-to-IP routing table according to various implementations.

Figure 1:
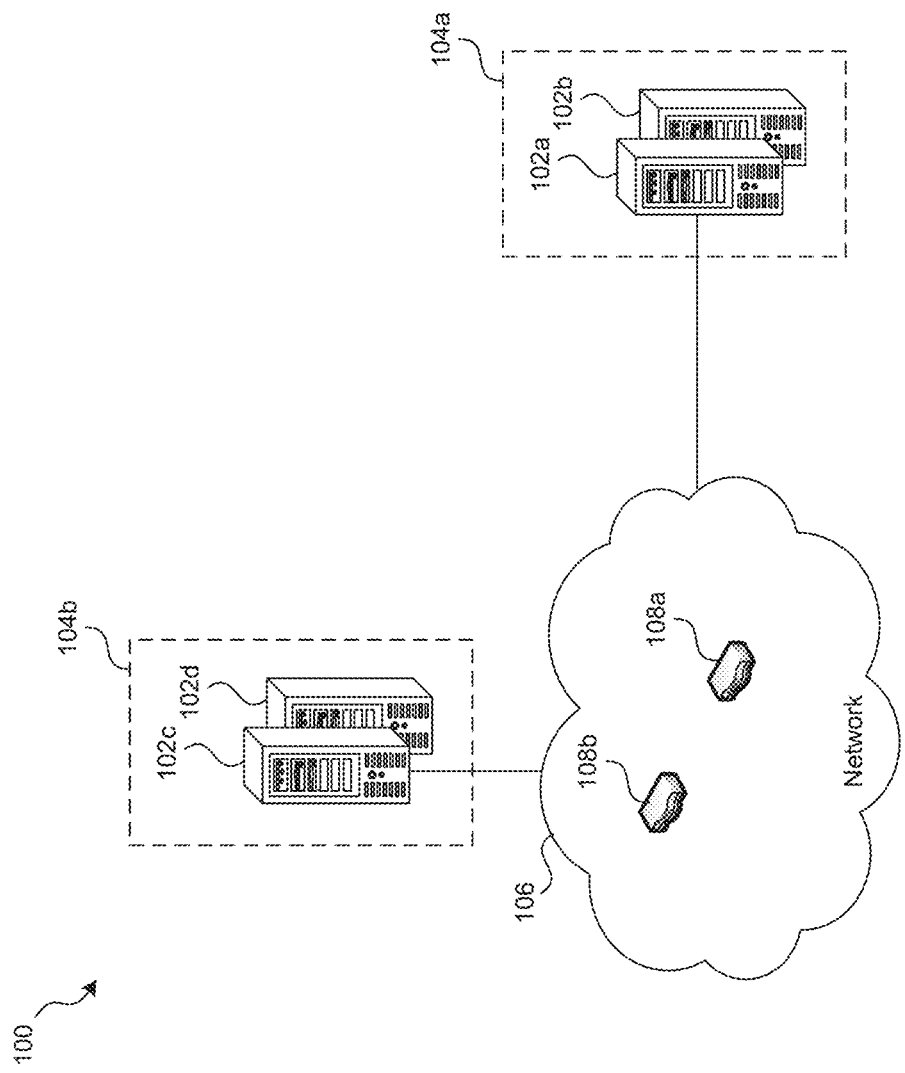
FIG. 1 is a diagram of a representative environment in which a system for container routing using Open Shortest Path First (OSPF) (the "container routing system") can operate.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

A system that facilitates routing among isolated software systems, such as software containers, between computing nodes of a distributed computer network (the "container routing system"), is disclosed herein. The system enables routing between computing nodes, as well as between software containers associated with customers and being run on those nodes, over an Infrastructure as a Service (IaaS) network shared by multiple customers. The system provides full end-to-end IP connectivity, whereby software services (executing within containers) of a single customer can communicate with each other even when the services are executing on computing nodes within the network that are physically remote from each other. The system further provides network isolation, whereby the containers associated with a customer share an IP space that is isolated from the IP space of the containers associated with other customers. The system provides IP isolation even when containers associated with multiple different customers are executing on a single node.

As described herein, the system can utilize existing routing algorithms, in combination with specialized, modified, or encapsulated messages, to provide isolated end-to-end connectivity between customer containers that are distributed across a network. In some implementations, the system utilizes the Open Shortest Path First (OSPF) routing protocol to learn and distribute aspects of the routes between containers within the network. To provide certain benefits over the underlying routing protocol, such as enabling the use of multiple containers associated at a single computing node while providing IP isolation between those containers, the system can encapsulate the messages of the underlying routing protocol (e.g., OSPF messages) with IP-to-IP encapsulation messages to facilitate communication between nodes that are remote from one another, thereby establishing customer-specific overlay networks that provide isolation from other customers. By combining existing routing algorithms with generated encapsulation messages, the system preserves the benefits of the underlying routing algorithms (e.g., scalability, fault tolerance, and extent of adoption) while providing additional benefits (e.g., multiple clusters operating as microservices at single computing nodes, and isolation between customer traffic).

To route between nodes in the network, the system establishes routing information characterizing the containers, their associated nodes, and the routes between the nodes. In some implementations, for example when not all nodes in the network have a direct point-to-point connection with every other node in the network, a single node is used to collect routing information from all other nodes, and to distribute the aggregated routing information across the network. In implementations of the system in which OSPF is used as the underlying routing protocol, this single node that operates as the central point for exchanging routing information is referred to as the "designated router" (or the "DR node"). The DR node can be pre-selected based on an initial configuration, can be selected based among the nodes in the network based on a voting scheme, or other known configuration options. In some implementations, the system also selects a backup designated router (referred to as a "BDR node"). Other nodes within the network may be referred to as "DRother nodes."

As described herein, the system generates routing information based on a series of messages between other nodes in the network (i.e., DRother nodes) and the DR node. The messages between the DRother nodes and the DR node can include messages generated by known routing algorithms utilized by the system (e.g., system-generated OSPF messages). The messages between the DRother nodes and the DR node can also include encapsulation messages, which encapsulate underlying routing messages (i.e., OSPF messages) with additional information that facilitate routing across the network. For example, the system can generate an OSPF message (or the "underlying message" or "encapsulated message") that addresses a destination DR node based on a router ID for the DR node; the system can encapsulate the underlying OSPF message with an encapsulation message that addresses the destination with the corresponding node IP address, and the receiving DR node can de-encapsulate the message to obtain the underlying OSPF message. By utilizing encapsulation IP-to-IP messages, which include encapsulated OSPF messages, the system is able to generate routing information that encompasses the router ID of nodes within the network with the IP address of those nodes. The routing information additionally includes information regarding the services running on the nodes, such as the IP address of the containers corresponding those services. After the routing information has been established, the system utilizes it to enable communication between containers assigned to a customer.

It will be appreciated that the use of OSPF provides certain benefits to the system. For example, because OSPF uses a link state routing (LSR) algorithm, every node in the network will have the same link state database (LSDB), characterizing the topology of the network, without requiring full connectivity and communication between all nodes in the network. Furthermore, the use of OSPF areas facilitates isolating traffic of a customer. Though primarily described with reference to using the OSPF routing algorithm, it will be appreciated that the system can utilize other routing algorithms providing the same or other benefits.

Various implementations of the system will now be described. The following description provides specific details for a thorough understanding and an enabling description of these implementations. One skilled in the art will understand, however, that the system can be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 and the following discussion provide a brief, general description of a suitable environment in which a system for container routing using OSPF can be implemented. Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions may reside on a client computer.

FIG. 1 illustrates an example environment 100 in which a system for container routing using OSPF (the "container routing system") operates. The environment can include server computers 102a, 102b, 102c, and 102d. The server computers can be physically located at locations 104a and 104b. That is, as illustrated, server computers 102a and 102b can be located at the same location 104a, while server computers 102c and 102d can be located at the same location 104b. Locations 104a and 104b can be remote from one another; for example, the locations can be two data centers at different geographic locations (e.g., different city, state, or country), or at two different areas within a data center (e.g., different wings, floors, rooms, or racks). The server computers 102a-102d communicate with each other and with other devices through one or more public or private wired or wireless networks 106, including, for example, the Internet. The network 106 includes one or more network routers 108a and 108b that facilitate the routing of traffic through the network. The server computers 102a-102d and network routers 108a-108b communicate through the network 106 using, for example, TCP/IP protocols.

The server computers 102a-102d can be part of an IaaS network, such as network 106, and provide compute resources to customers or end-users of the IaaS network. For example, various customers can utilize the IaaS network to perform various software services running on the server computers 102a-102d. The server computers 102a-102d can utilize software virtualization or other techniques to concurrently execute software services for multiple customers while maintaining isolation between those services. For example, individual software services executing on a server computer 102a-102d can be isolated within software containers (e.g., Docker, Linux-VServer, LXC, LXD, OpenVZ, or other forms of containers implemented in the Linux operating system), Kubernetes, or other virtual machines. Though primarily described with reference to using software containers, it will be appreciated that the system can utilize other software or hardware-based techniques that provide virtualization and/or isolation of software running on a computer.

The server computers 102a-102d and network routers 108a-108b contain data utilized by the container routing system, and in some implementations, software necessary to perform functions of the system. For example, the server computers 102a-102d and network routers 108a-108b can store routing information that enables routing between one software service (or container) executing on a server computer and another software service (or container) executing on a different server computer. As a further example, the server computers 102a-102d and network routers 108a-108b store software to generate the routing information, including software routines to generate underlying routing messages, routines to encapsulate the underlying routing messages with encapsulation messages that enable a network overlay, etc. As will be described in more detail herein, the system utilizes sequences of routing messages and encapsulation messages to generate routing information that identifies where software services are being executed within the IaaS network (i.e., on which server computer the software service is executing), and efficiently distributes the routing information throughout the IaaS network.

Figure 2:
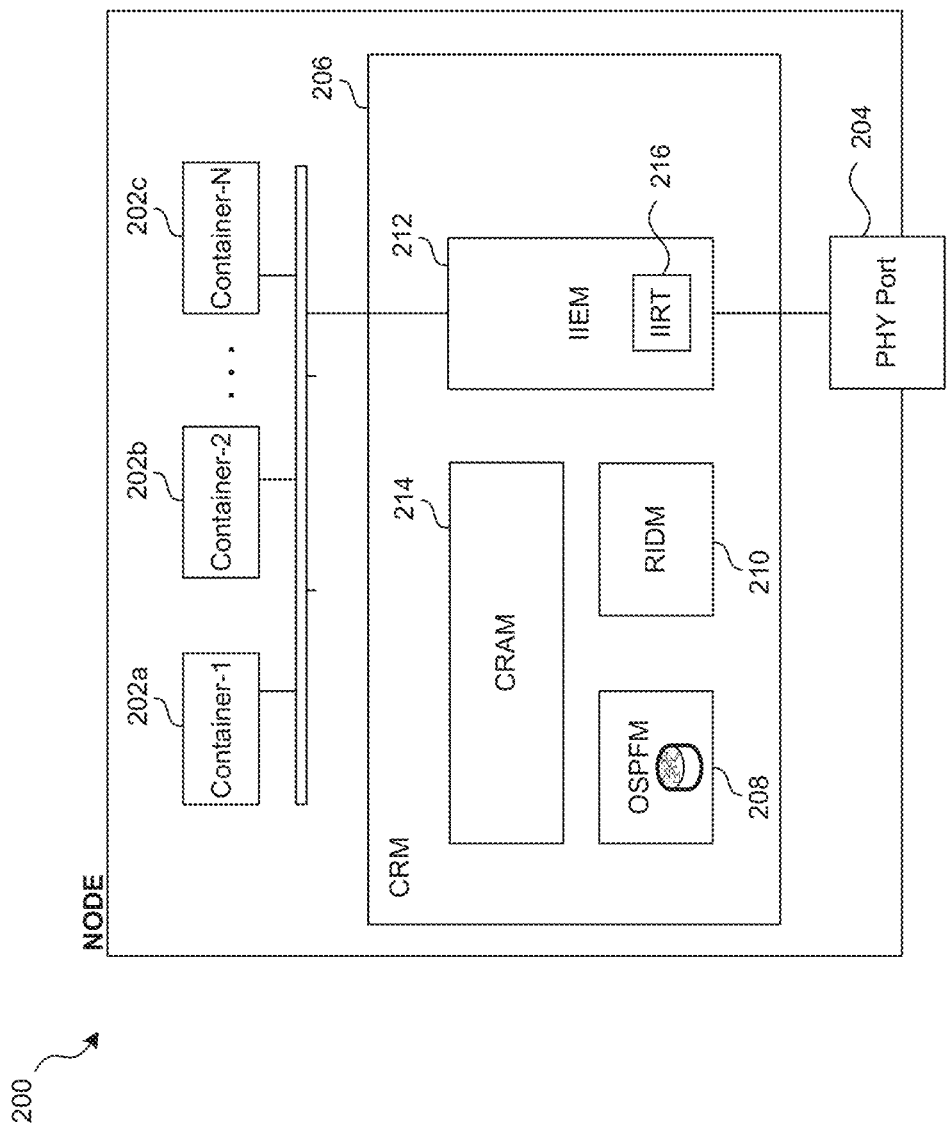
FIG. 2 is a block diagram of a representative computing node utilized in the container routing system.

FIG. 2 is a block diagram of a representative computing node 200 utilized in the container routing system. The computing node 200 can, for example, be part of a server computer connected to a network, such as the server computers 102a-102d illustrated in FIG. 1. One or more software applications or software services can execute on the computing node 200, including containers 202a-202c. The system can utilize the containers 202a-202c for the virtualized and/or contained execution of one or more software services associated with customers of an IaaS network. That is, for example, a first software service of a first customer can execute within container 202a, a first software service of a second customer can execute within container 202b, and a second software service of the first customer can execute within container 202c. As described herein, the system facilitates the communication between services associated with a customer (e.g., between containers 202a and 202c) while isolating those communications from the services of other customers (e.g., container 202b).

The computing node 200 includes a physical port 204 (or "PHY port") that couples the computing node to a data network, including the IaaS network, the Internet, etc., such as the network 106 illustrated in FIG. 1. The PHY port 204 and/or computing node 200 can be associated with an IP address, which identifies the computing node and facilitates locating the computing node within the data network. As described herein, the system directs network traffic destined for a software service (and the containers 202a-202c in which the service is executed) to the PHY port 204 of the computing node 200 on which the software service is run.

The computing node 200 additionally includes a container routing module 206 (the "CRM") that establishes routing information, and uses the established routing information between containers 202a-202c executing on various computing nodes connected to the IaaS network. The CRM 206 includes an Open Shortest Past First routing module 208 (the "OSPFM"), a router identification module 210 (the "RIDM"), an IP-in-IP encapsulation module 212 (the "IIEM"), and a cloud routing algorithm module 214 (the "CRAM"), which operate collectively to establish and use routing information between containers. The operation of these modules is described further below.

The Open Shortest Path First routing module 208 (the "OSPFM") generates various OSPF messages or packets between computing nodes 200 (e.g., a DRother node and a DR node) to establish aspects of the routing information regarding the computing node. For example, the OSPFM 208 can generate messages that establish a neighbor relationship between the computing node (designated as a DRother node) and another computing node (designated as a DR node) (e.g., OSPF Hello packets). The OSPFM 208 can also generate messages that advertise the isolated IP space of the containers 202a-202c executing on the computing node 200, as well as that advertise the IP address of the computing node and/or PHY port 204 (e.g., OSPF Link State Update packets). The OSPFM 208 can utilize OSPF parameters that facilitate the generation of an overlay network. For example, the OSPFM 208 can establish a non-broadcast multiple access ("NBMA") network.

The router identification module 210 (the "RIDM") assigns and associates the unique identifiers utilized by the underlying routing protocol, such as OSPF router IDs, for the corresponding computing nodes 200. The RIDM 210 can perform different functions depending on whether the corresponding computing node 200 has been designated as the DR node or a DRother node within the network. For example, the RIDM 210 of a DRother node generates requests (e.g., OSPF Hello packets) to obtain at least one router ID ("RID") and network mask, and configures the computing node to use the RID and network mask that have been assigned. As a further example, the RIDM 210 of a DR node assigns RIDs and networks masks to other nodes (e.g., DRother nodes) in response to received requests.

The IP-in-IP encapsulation module 212 (the "IIEM") provides encapsulation and de-encapsulation of messages used by the underlying routing protocol, such as OSPF packets. For example, on the transmit side (e.g., a DRother advertising information to a DR, a DR responding to a DRother, or a source node sending data from one of its containers to a destination node) the IIEM 212 encapsulates OSPF packets (which address a RID) with an encapsulation message that addresses the IP address of the destination computing node. As described herein, encapsulation is based on an IP-to-IP encapsulation routing table 216 (the "IIRT") that the system generates and maintains. As a further example, on the receive side, the IIEM 212 de-encapsulates the encapsulation message, and routes the underlying OSPF packet to the corresponding RID and/or container at the destination node. The IIEM 212 additionally configures other routing tables of the corresponding computing node 200, such as for example an IPTable on a computing node running Linux.

The cloud routing algorithm module 214 (the "CRAM") orchestrates the operation of other modules (e.g., the OSPFM 208, the RIDM 210, and the IIEM 212) to build the IIRT 216. The various message sequences that are triggered by the CRAM 214 and build the IIRT 216 are described further below.

Although not illustrated, computing node 200 typically includes one or more of the following: a processor for executing processing instructions, a data storage medium component (e.g., hard drive, flash memory, memory card, etc.), volatile memory and/or nonvolatile memory, a power supply, one or more network interfaces, and input and/or output interfaces (e.g., a keyboard, a display, etc.). The various components of the computing node 200 can be interconnected via a bus. The volatile and nonvolatile memories generally include storage media for storing information such as processor-readable instructions, data structures, program modules, or other data. Some examples of information that can be stored include basic input/output systems (BIOS), operating systems, and applications. The stored information can include one or more components for the container routing system.

Figure 3:
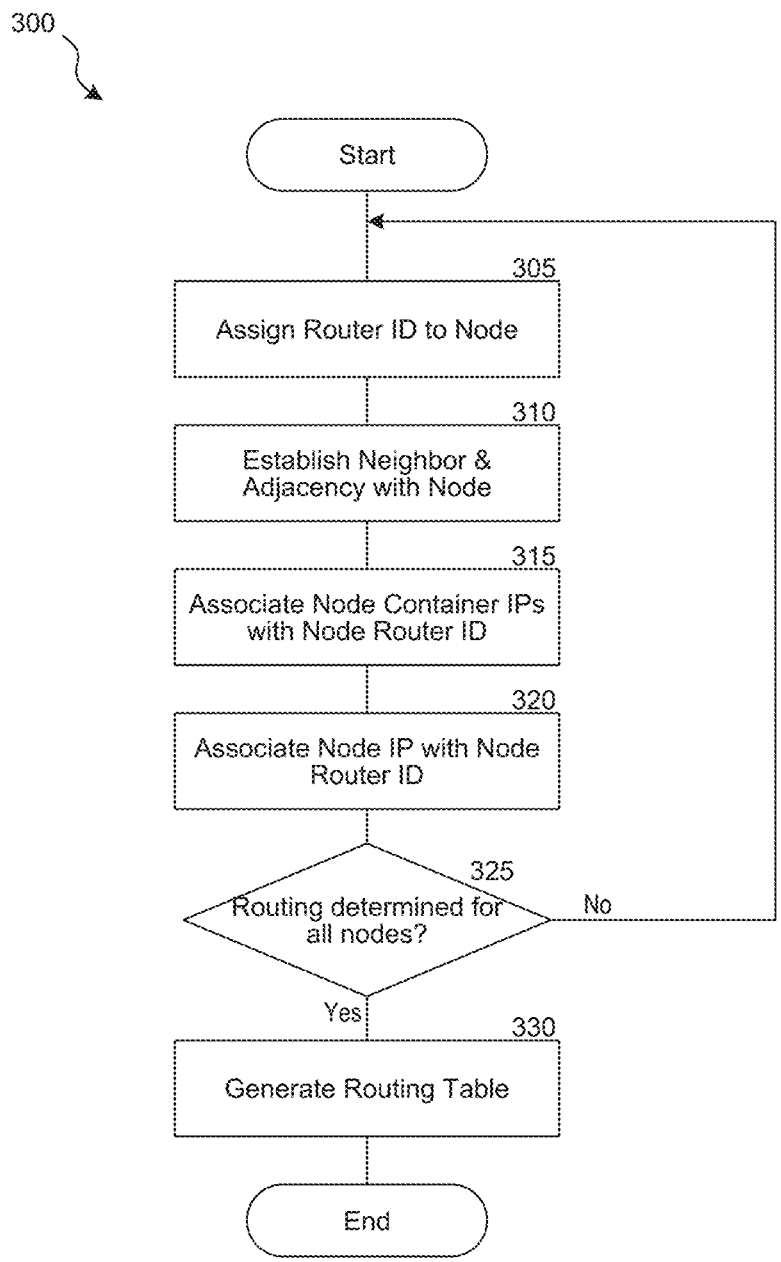
FIG. 3 is a flow chart of a process implemented by the container routing system to configure computing nodes to route network traffic.

Flows for Establishing Container Routing Information and Routing Inter-Container Traffic FIG. 3 is a flow diagram illustrating example process 300, implemented by a system for container routing using OSPF, to establish routing information for computing nodes within a network (such as an IaaS network).

The process 300 begins at a block 305, where the system assigns a router ID to a computing node. The router ID can, for example, be assigned to the computing node by another node within the network, such as a designated node or designated router ("DR node") in implementations of the system in which the OSPF routing protocol is used. As described herein, the system utilizes the router ID, in addition to other information (e.g., the IP address of the computing node) to route network traffic to software services associated with the router ID and running on the computing node. The system can additionally assign multiple router IDs to a computing node. For example, as described herein, if software services associated with multiple customers or users are executing on a computing node, the system can assign one router ID per customer. The router ID facilitates routing to the multiple software services associated with a customer on that computing node. An example operation for assigning a router ID is further described below with reference to message sequence diagram 400 in FIG. 4.

At a block 310, the system establishes a neighbor and adjacency relationship between the computing node and another node in the network, such as the DR node. In implementations of the system in which the OSPF routing protocol is used, the network can be configured such that the computing node primarily communicates with the DR node to initialize and establish routing information (as opposed to the computing node broadcasting routing information to all other nodes in the network). Establishing the neighbor and adjacency relationship with the DR node enables sharing additional information about the computing node, such that routing information can be shared. An example operation for establishing a neighbor and adjacency relationship is further described below with reference to message sequence diagram 500 in FIG. 5.

At a block 315, the system associates the IP addresses of any containers running on the computing node with the router IDs assigned to the computing node. The computing node can be used within an IaaS network to perform multiple software services for different network customers, and each service can be executed within a container. As described herein, once routing information for the network has been established, the system utilizes the association of the container IP addresses with router IDs to facilitate routing of traffic between containers across the IaaS network. That is, if a first software service executing within a first container on a first computing node wishes to communicate with a second software service executing within a second container on a second computing node, the first container generates a data packet addressed to the IP address of the second container. The system then utilizes the container IP address and router ID association information to generate an encapsulation message that can be routed over the overlay network. An example operation for associating container IP addresses with router IDs is further described below with reference to message sequence diagram 600 in FIG. 6.

At a block 320, the system associates the router IDs assigned to the computing node with the IP address of the computing node (or the IP address of a network port, or PHY port, of the computing node). As described herein, once routing information for the network has been established, the system utilizes the association of router IDs with computing node IP addresses to further facilitate routing of traffic between containers across the IaaS network. That is, continuing with the representative example described with reference to the block 315, the system can utilize the router ID and computing node IP association information to generate an encapsulation message destined for the IP address of the second computing node, on which the second container is being executed. As described herein, the second computing node then de-encapsulates the message to obtain the underlying packet, addressed to the IP address of the second container. An example operation for associating router IDs with computing node IP addresses is further described below with reference to message sequence diagram 700 in FIG. 7.

At a decision block 325, the system determines whether there are other nodes for which routing information needs to be determined and broadcast. For example, within an IaaS network or a portion of the IaaS network there can be multiple nodes in communication with a designated node. Each of the nodes may need to be assigned router IDs by the system, establish neighborship and adjacency relationships, and enable the system to associate container IP addresses, node IP addresses, and router IDs. If the system determines that not all nodes have communicated their routing information, then the process 300 returns to the block 305 to assign a router ID to the next computing node. If the system determines that all nodes have communicated their routing information, then the process continues to block 330.

At the block 330, the system generates routing information that enables routing over the overlay network. For example, the system can generate an IP-to-IP routing table (IIRT), or similar structure, that associates the IP addresses of executing software services and containers with the routing protocol identifiers of the computing node on which the service is being executed, as well as with the IP address of the computing nodes. In implementations of the system in which the underlying routing protocol is OSPF, the system can for example generate the routing information table by querying the Link-State Database (LSDB) of nodes in the network, and aggregating the information in table (such as the IIRT).

As described above, FIGS. 4-7 illustrate representative message sequences used by the system to establish routing information for a node within the network. Although the message sequences refer to semantics and parameters of OSPF packets, it will be appreciated that the system can use other routing protocols.

Figure 4:
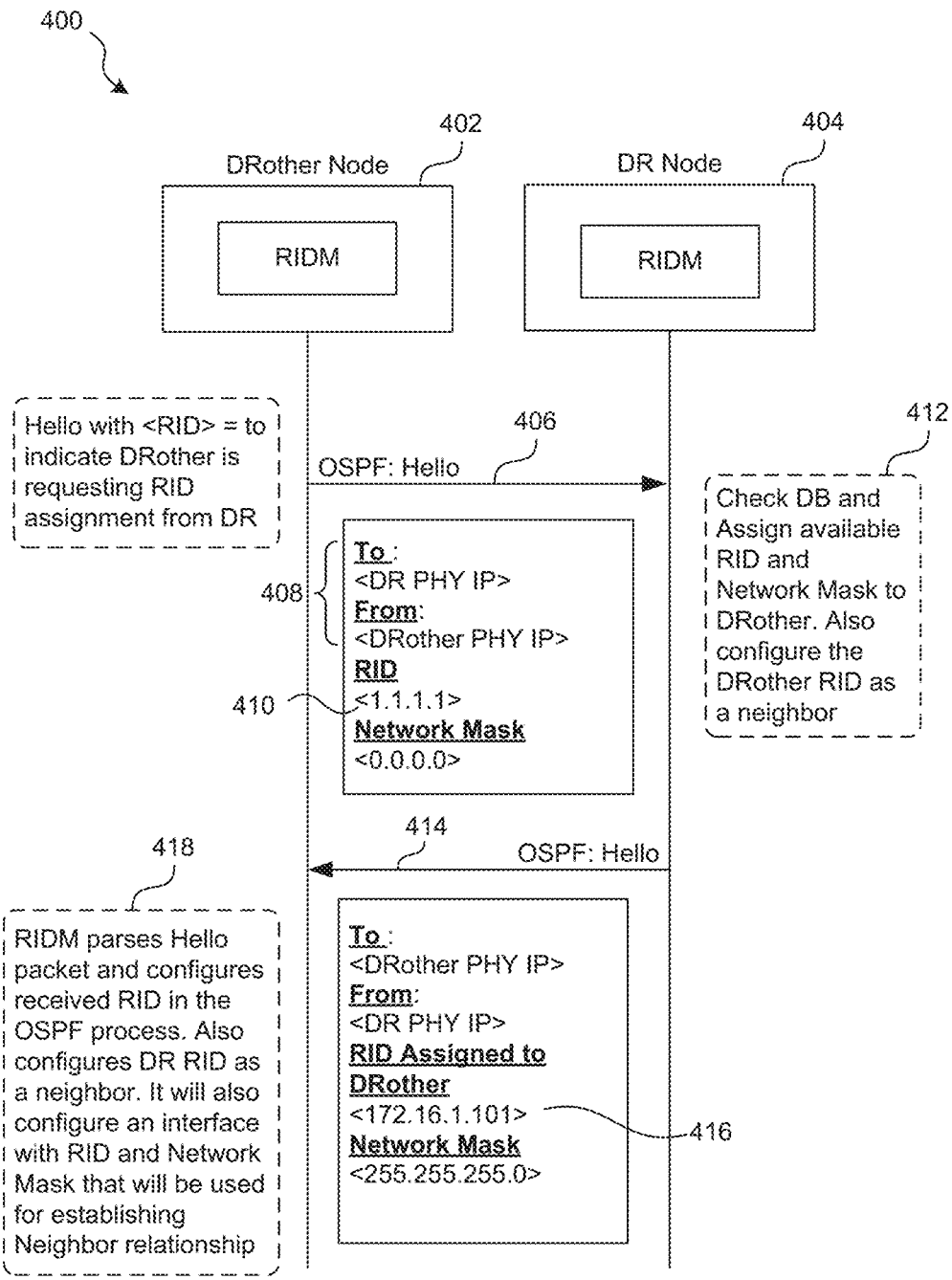
FIG. 4 illustrates an assigning message sequence diagram between computing nodes according to various implementations.

Referring to the message sequence diagram figures, FIG. 4 illustrates an example message sequence diagram 400 used to assign a router ID to a node 402 in the network. The node 402 is also referred to as the DRother node, in contrast to the node 404 in the network that has been designated to perform certain functions (also referred to as the DR node). At an act 406, the DRother node 402 (using for example the RIDM described with reference to FIG. 2) generates an OSPF Hello packet to transmit to the DR node 404. The Hello packet includes source and destination information 408, which indicates the packet is addressed to the IP address of the DR node 404. The Hello packet additionally includes a value in a RID field (e.g., "1.1.1.1") to indicate that the DRother node 402 is requesting it be assigned a router ID.

At an act 412, the DR node 404 receives the Hello packet from the DRother node 402 and assigns the DRother node a router ID. The DR node 404 can, for example, maintain a list of router IDs that have been assigned to other nodes, or a free list of unassigned router IDs, and selects an available router ID to assign to the DRother node 402. The DR node 404 can also assign other parameters in addition to the router ID, including a network mask and an area designation associated with a customer of the network. The DR node 404 can also configure the router ID it assigns to the DRother node 402 as a neighbor of the DR node. Selection of the router ID and other parameters, as well as configuration of the DR node 404, can be performed for example by the RIDM described with reference to FIG. 2.

At an act 414, the DR node 404 generates a Hello packet to transmit to the DRother node 402, with addressing information indicating the packet's destination is the IP address of the DRother node. The Hello packet includes the router ID 416 and network mask that was assigned to the DRother node 402 by the DR node 404. The Hello packet can also include other network parameters, including the router ID of the DR node 404.

At an act 418, the DRother node 402 configures itself based on the received Hello packet. For example, the DRother node 402 sets its router ID and network mask to the values assigned to it by the DR node 404 and included in the Hello packet transmitted at act 414. The DRother node 402 can also designate the router ID of the DR node 404 as a neighbor.

In some embodiments the message sequence, which illustrates an example of assigning a single router ID to a DRother node 402, can be repeated to assign multiple router IDs to the DRother node 402. In some embodiments the illustrated message sequence can assign multiple router IDs (e.g., multiple router IDs are assigned and conveyed via a single Hello packet). As described herein, the system assigns one router ID corresponding to each grouping of containers (e.g., all of the software services of a single customer) executing on the node.

As described herein, the system generates an IP-to-IP encapsulation routing table (IIRT) containing routing information that the system uses to enable inter-container routing. FIGS. 8A-8C, described further below, illustrate an example IIRT that is populated as additional routing information is determined (e.g., as a result of the various steps of the process 300 illustrated in FIG. 3, or as a result of the message sequences illustrated in FIGS. 4-7). The example IIRTs illustrated in FIGS. 8A-8C are intended to illustrate the types of information that could be incorporated into the IIRT as a result of each step or flow; the system does not necessarily maintain "partial" IIRT data while routing information is still being determined, but rather can generate the IIRT once all flows have been performed.

Referring to the IIRT illustration figures, FIG. 8A illustrates an example IP-to-IP encapsulation routing table (IIRT) 800a that illustrates the result of assigning a router ID to a node (e.g., as a result of the message sequence diagram 400 illustrated in FIG. 4). The IIRT 800a stores routing information for the different computing nodes in the network (each of which can correspond to a separate row in the table), including the OSPF area 802 assigned to the node or to a customer with services executing on the node, the container IP address 804 of the containers running on the node, the router ID 806 assigned to the node, and the node IP address 808. As a result of the router ID assignment flow, the IIRT 800a includes an assigned router ID 812, assigned to the corresponding node by the system (e.g., by a designated node). The IIRT 800a additionally includes an assigned area ID 810 which, for example, can be uniquely assigned by the system to a customer of the IaaS network that has services executing on the corresponding node. As illustrated, assigning a router ID to a computing node still leaves certain routing information for the node unpopulated in the IIRT 800a (e.g., container IP addresses and node IP addresses).

Figure 5:
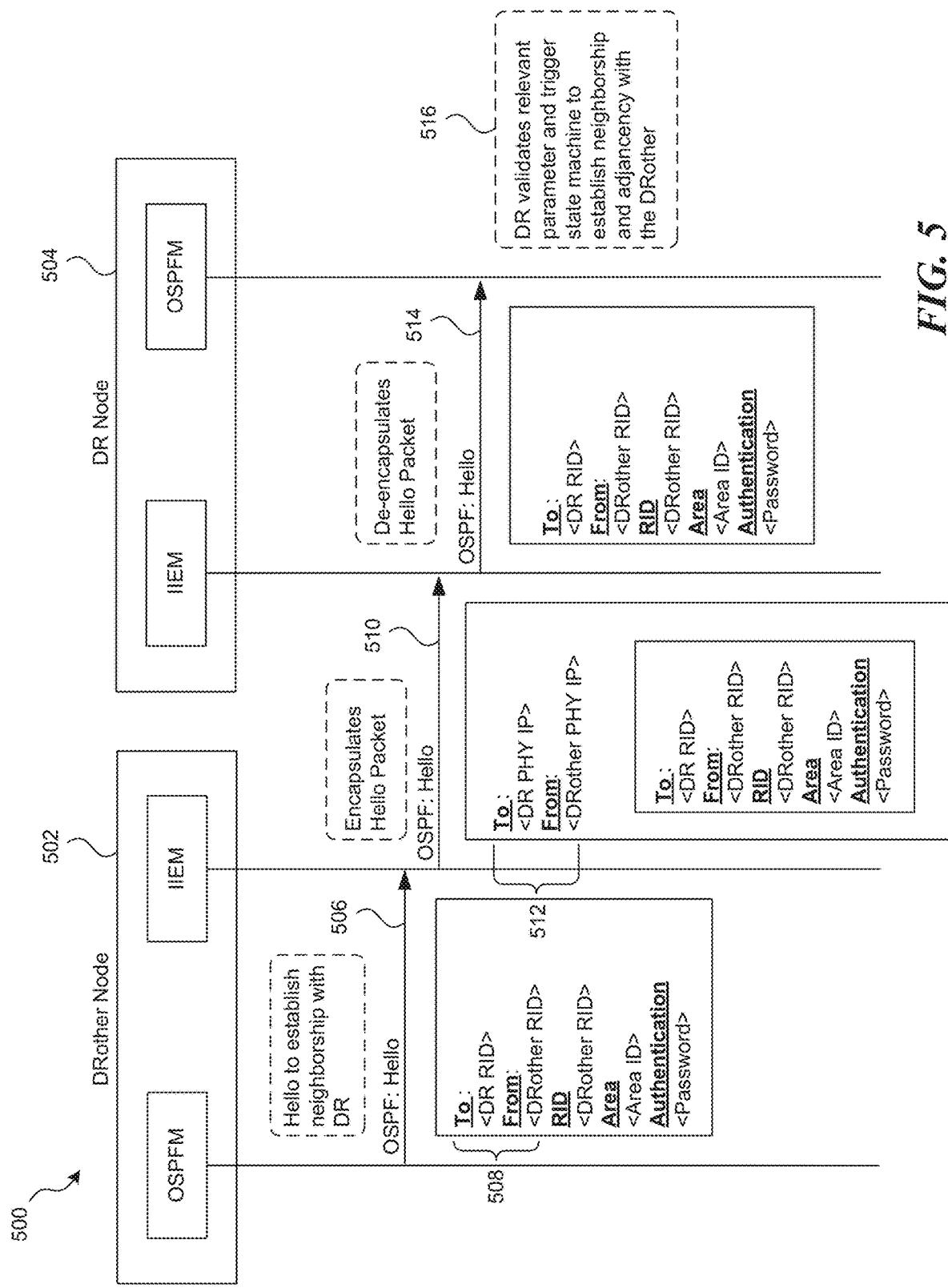
FIG. 5 illustrates an establishing message sequence diagram between computing nodes according to various implementations.

Referring again to the message sequence diagram figures, FIG. 5 illustrates an example message sequence diagram 500 used to establish a neighborship and adjacency relationship between a computing node in the network, such as DRother node 502, and a designated node, such as DR node 504. At an act 506, the DRother node 502 generates an OSPF Hello packet. The OSPF Hello packet can, for example, be generated by the OSPFM of the DRother node 502, as described with reference to FIG. 2. The OSPF Hello packet includes addressing information 508, which identifies the source and destination of the packet using router IDs (i.e., the packet source is one of the router IDs of the DRother node 502, and the packet destination is the router ID of the DR node 504). The generated OSPF Hello packet can include additional information, such as the area ID associated with the transmitting DRother node router ID and authentication information.

At an act 510, the DRother node 502 encapsulates the Hello packet generated at the act 506 into an encapsulation message. The encapsulation can be performed, for example, by the IIEM (described in FIG. 2) of the DRother node 502, using an IIRT, LSDB, or other data associating router IDs with IP addresses. That is, the encapsulation message includes encapsulation addressing information 512, which identifies the source and destination of the encapsulation message using IP addresses (i.e., the encapsulation message source is the DRother node 502 IP address, and the encapsulation message destination is the DR node 504 IP address).

At an act 514, the DR node 504 de-encapsulates the encapsulation message to obtain the encapsulated OSPF Hello packet. De-encapsulation can be performed, for example, by the IIEM of the DR node 504 that receives the encapsulation message.

At an act 516, the DR node 504 evaluates the de-encapsulated OSPF Hello packet and forms a neighborship and adjacency relationship with the source of the packet (i.e., the DRother node 502). The relationship can be formed, for example, based on the source router ID and other parameters (e.g., area and password) included in the Hello packet. The relationship can be established by processing the OSPF packet with a state machine implemented by the OSPFM (described in FIG. 2) of the DR node 504. The illustrated message sequence can repeat to establish neighborship and adjacency relationships using any other router IDs assigned to the DRother node 502.

Figure 6:
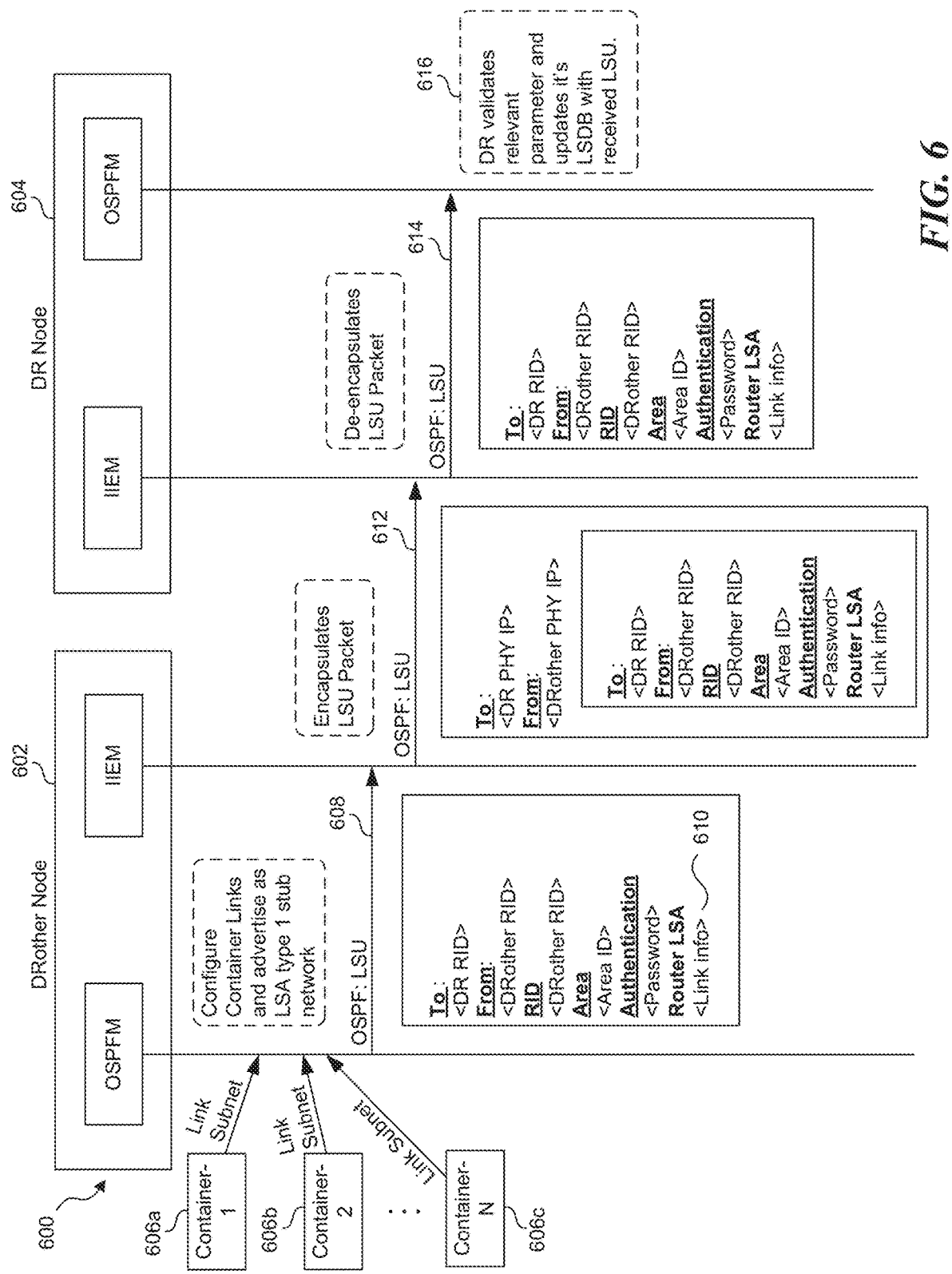
FIG. 6 illustrates a container advertising message sequence diagram between computing nodes according to various implementations.

FIG. 6 illustrates an example message sequence diagram 600 used to advertise the IP space of containers executing on a computing node in the network, such as DRother node 602, to a designated node, such as DR node 604. As described herein, the software services of multiple customers can be running on the DRother node 602, each of which can execute within virtualized and/or isolated software environments, such as containers 606a, 606b, 606c, etc. Furthermore, each of containers 606a-606c can be associated with their own IP address or range of IP addresses.

At an act 608, the DRother node 602 generates a Link State Update (LSU) packet that is used to advertise the IP addresses of containers 606a-606c. The LSU packet includes Link-State Advertisement (LSA) information 610, which is used in the OSPF routing protocol to communicate a node's local routing topology to other local nodes. Information regarding the containers 606a-606c, including their associated IP addresses, link subnet, and other information used to route traffic to the containers executing on the DRother node 602, is included in LSA information 610. By advertising routing information to containers 606a-606c as part of a LSU packet, the DRother node 602 provides the rest of the system with information on how to route to the software services executing on the node. The system can utilize a specified LSA type to indicate to other nodes (e.g., the DR node 604) that the LSA information 610 found in the LSU packet contains routing information to containers 606a-606c executing on the DRother node 602. In some implementations, the system utilizes LSA type 1 to indicate the LSA information 610 contains container routing information.

At an act 612, the DRother node 602 encapsulates the LSU packet generated at the act 608 into an encapsulation message. The encapsulation can be performed, for example, by the IIEM (described in FIG. 2) of the DRother node 602, using an IIRT, LSDB, or other data associating router IDs with IP addresses. That is, the encapsulation message includes encapsulation addressing information, which identifies the source and destination of the encapsulation message using IP addresses (i.e., the encapsulation message source is the DRother node 602 IP address, and the encapsulation message destination is the DR node 604 IP address).

At an act 614, the DR node 604 de-encapsulates the encapsulation message to obtain the encapsulated OSPF LSU packet. De-encapsulation can be performed, for example, by the IIEM of the DR node 604 that receives the encapsulation message.

At an act 616, the DR node 604 evaluates the de-encapsulated OSPF LSU packet and updates its Link-State Database (LSDB) based on the LSA information 610 and other contents of the packet. That is, for example, the DR node 604 populates its LSDB with the received routing information for containers 606a-606c and associates the container routing information with the source router ID of the de-encapsulated LSU packet.

In some embodiments the illustrated message sequence can repeat to advertise the containers for multiple customers associated with a node. For example, a first LSU packet can be generated by the system to advertise the containers corresponding to a first customer executing on the node (using the source router ID associated with that customer), and a second LSU packet can be generated by the system to advertise the containers corresponding to a second customer (using the source router ID associated with that customer).

FIG. 8B illustrates an example IP-to-IP encapsulation routing table (IIRT) 800b that illustrates the result of a node advertising the routing information to the containers running on that node (for example, as a result of the message sequence diagram 600 illustrated in FIG. 6). As a result of the container advertisement flow, the IIRT 800b includes the routing information, such as container IP address 820, of a container. Other information related to the container and node, such as assigned router ID and area ID, can already be present from a different flow (e.g., as a result of the message sequence diagram 400 illustrated in FIG. 4).

Figure 7:
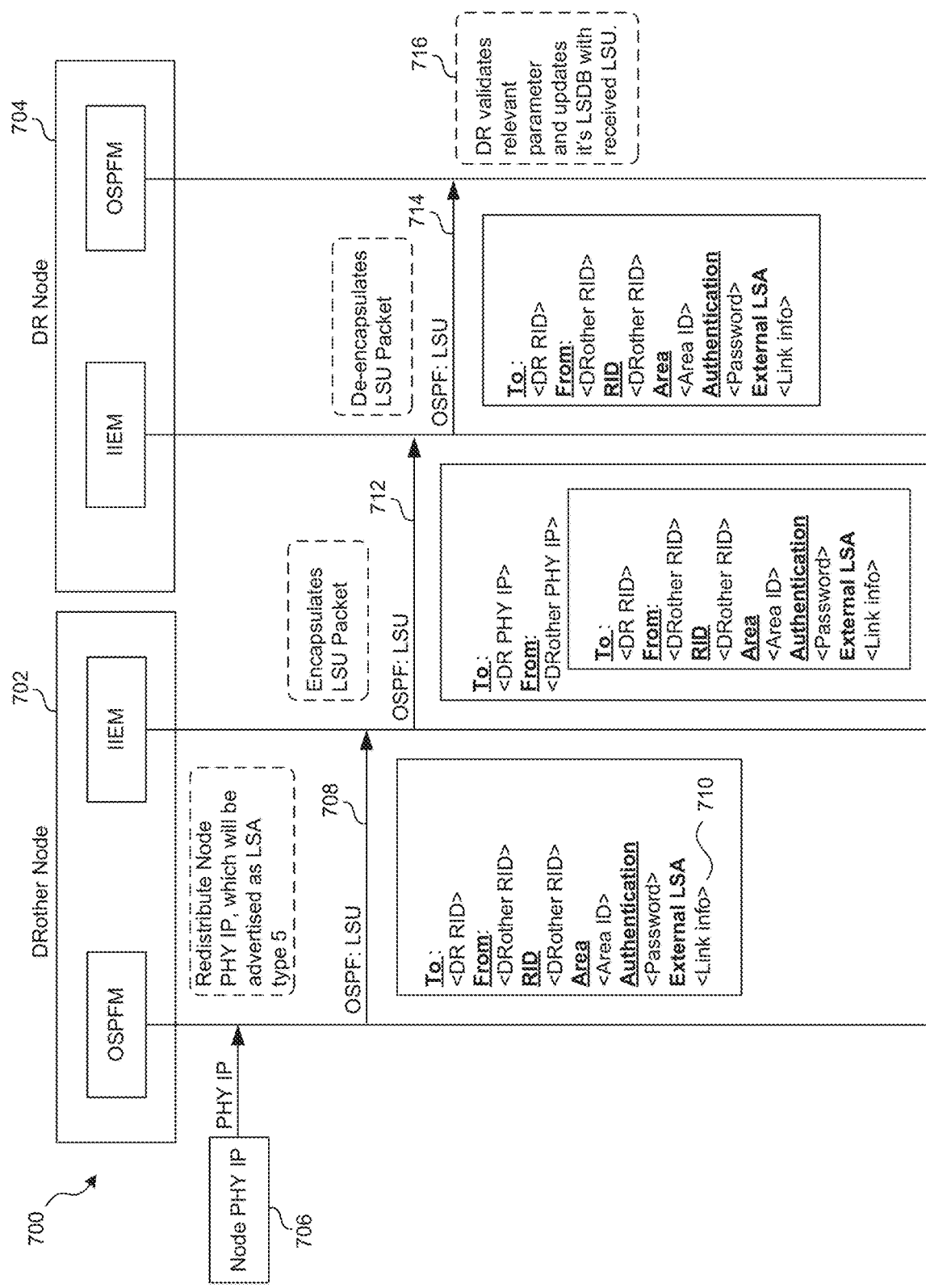
FIG. 7 illustrates a node advertising message sequence diagram between computing nodes according to various implementations.

Referring again to the message sequence diagram figures, FIG. 7 illustrates an example message sequence diagram 700 used to advertise the IP address 706 of a computing node in the network, such as DRother node 702, to a designated node, such as DR node 704.

At an act 708, the DRother node 702 generates a Link State Update (LSU) packet that is used to advertise the node IP address 706. The LSU packet includes Link-State Advertisement (LSA) information 710, which contains routing information including the node IP address 706. By advertising the node IP address 706 as part of a LSU packet, the DRother node 702 provides the rest of the system with information regarding the overlay network (e.g., the IP address of nodes on which software services are being executed). The system can utilize a specified LSA type to indicate to other nodes (e.g., the DR node 704) that the LSA information 710 found in the LSU packet contains the node IP address 706 of the DRother node 702. In some implementations, the system utilizes LSA type 5 to indicate that LSA information 710 contains node IP address information.

At an act 712, the DRother node 702 encapsulates the LSU packet generated at the act 708 into an encapsulation message. The encapsulation can be performed, for example, by the IIEM (described in FIG. 2) of the DRother node 702, using an IIRT, LSDB, or other data associating router IDs with IP addresses. That is, the encapsulation message includes encapsulation addressing information, which identifies the source and destination of the encapsulation message using IP addresses (i.e., the encapsulation message source is the DRother node 702 IP address, and the encapsulation message destination is the DR node 704 IP address).

At an act 714, the DR node 704 de-encapsulates the encapsulation message to obtain the encapsulated OSPF LSU packet. De-encapsulation can be performed, for example, by the IIEM of the DR node 704 that receives the encapsulation message.

At an act 716, the DR node 704 evaluates the de-encapsulated OSPF LSU packet and updates its Link-State Database (LSDB) based on the LSA information 710 and other contents of the packet. That is, for example, the DR node 704 populates its LSDB with the received node IP address 706 and associates the node IP address with the source router ID of the de-encapsulated LSU packet.

FIG. 8C illustrates an example IP-to-IP encapsulation routing table (IIRT) 800c that illustrates the result of a node advertising its IP address (e.g., as a result of the message sequence diagram 700 illustrated in FIG. 7). As a result of the container advertisement flow, the IIRT 800c includes the node IP address 840 of a node. Other information related to the container and node, such as assigned router ID, area ID, and the container IP address, can already be present from one or more other flows.

FIG. 9 illustrates a completed IP-to-IP encapsulation routing table (IIRT) 900, which the system utilizes to enable inter-container routing between customers' software services over an IaaS network. For example, the IIRT 900 stores OSPF areas and container IP addresses, which uniquely identify the software services of each customer. That is, each customer of the IaaS network can be assigned a unique area identifier, and each software of the service can have an IP address corresponding to the container in which the software service is being executing. Referring to the figure, for example, rows 902 of the IIRT 900 correspond to a first customer (having area ID 10), rows 904 of the IIRT correspond to a second customer (having area ID 14), and row 906 of the IIRT correspond to a third customer (having area ID 15). It will be appreciated that while certain container IP addresses can be used by multiple customers (e.g., IP address 10.1.0.0/16 is used by all three customers in the illustrated IIRT 900), the system ensures that each customer's network traffic is isolated from other customers. For example, the use of different OSPF areas provides network isolation among the routes of different customers. For each customer service (i.e., area ID and container IP address), the IIRT 900 additionally includes the IP address of the computing node on which the service is running (the "NIP"), as well as the router ID assigned to that node (the "RID"). The assignment of customer-specific router IDs to the computing nodes facilitates routing over a customer-specific overlay network. For example, as illustrated in IIRT 900, computing node having an IP address 1.1.1.1 has executing on it a container associated with a customer having area ID 10, and a container associated with a customer having area ID 14. As illustrated, different router IDs are assigned to the computing node for each of the customers (e.g., router ID 172.16.1.101 for the first customer, and router ID 172.16.0.4 for the second customer). As described herein, the system utilizes the customer-specific router IDs to generate customer-specific routing information to computing nodes shared by different customers.

The system builds the IIRT 900 based on routing information previously collected (e.g., via previously described message sequence diagrams 400-700). As described herein, the system uses a designated node (the "DR node") to communicate with other nodes in the network, and assign and obtain routing information about those other nodes and the software services and containers executing on those nodes. The obtained information is saved to the Link-State Database (LSDB) of the DR node. Once the described message sequences are complete, the system can utilize the LSDB of the DR node to build the IIRT. That is, the system can query the LSDB of the DR node to obtain all routing information having the LSA type that was used to encode correlations between node IP addresses and router IDs (for example, LSA type 5 as described in the example message sequence diagram 700). The system can also query the LSDB of the DR node to obtain all routing information having the LSA type that was used to encode correlations between container routes (including IP addresses) and router IDs (e.g., LSA type 1 as described in the example message sequence diagram 600). Using the obtained correlations of node IP addresses with router IDs, and the correlations of router IDs with container routing information, the system maps node IP addresses with the container IP routes. Accordingly, as illustrated in FIG. 9, the IIRT 900 includes container routing information (including area and container IP addresses) and associated node IP address, as well as router ID. The IIRT can be built by the cloud routing algorithm module (the "CRAM"), described with reference to FIG. 2, of the DR node.

Figure 10:
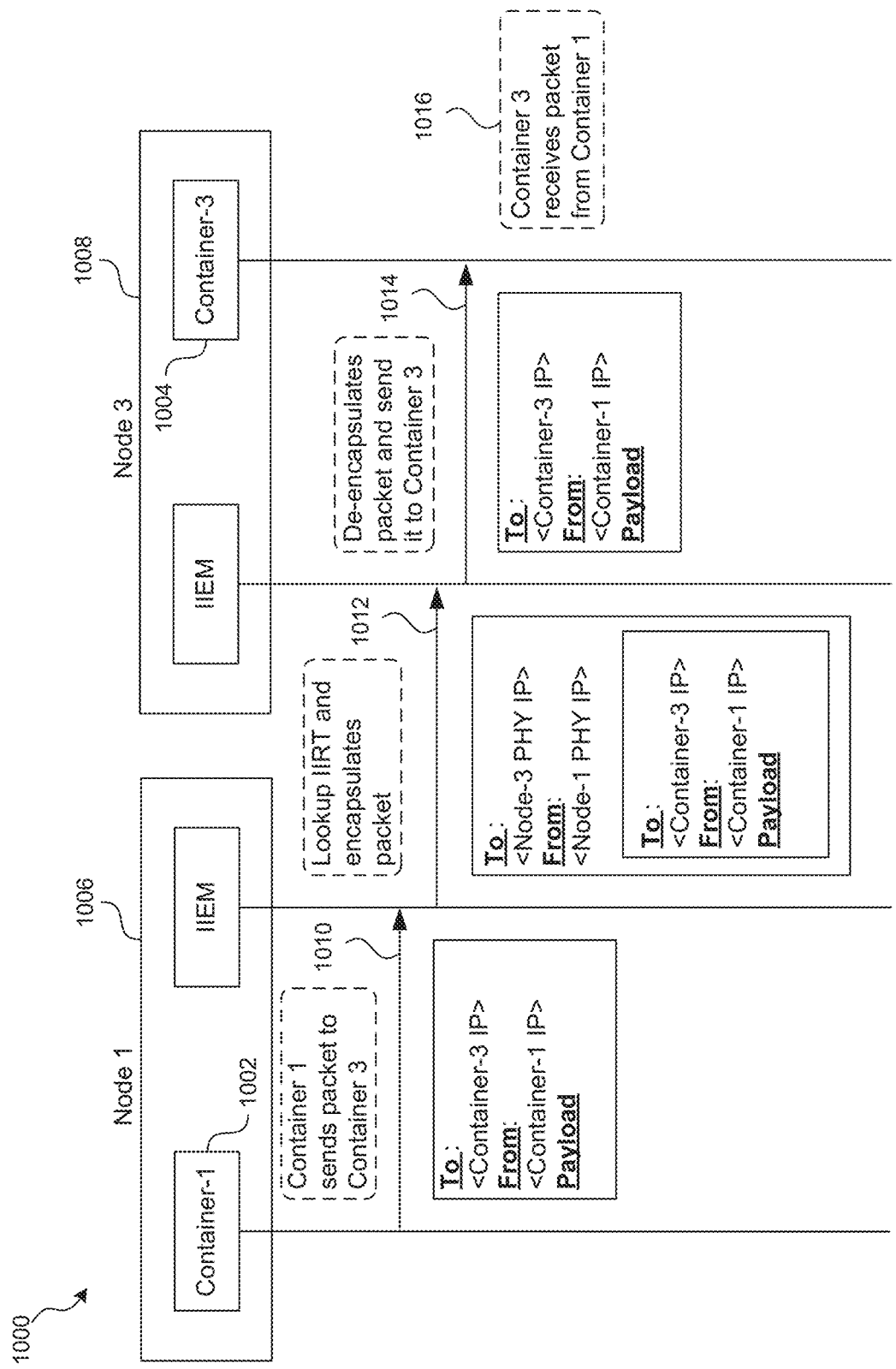
FIG. 10 illustrates inter-container routing message sequence diagram between computing nodes according to various implementations.

FIG. 10 illustrates an example message sequence diagram 1000 of communication between a first container 1002 and a second container 1004, which can be executing on a first node 1006 and a second node 1008, respectively. As described herein, containers 1002 and 1004 can be used to provide virtualized and/or isolated execution environments for the software services of a customer of an IaaS network. When the containers 1002 and 1004 are associated with the same IaaS customer, it can be necessary for them to communicate with each other despite executing on remote nodes 1006 and 1008.

At an act 1010, the first container 1002 generates a data packet with payload to be sent to the second container 1004. The generated data packet includes as its destination the IP address of the second container 1004. That is, the first container 1002 generates the data packet in a manner consistent with a computing environment in which services are not executing in one of multiple virtualized environments running concurrently on a computing node. Instead, the first container 1002 generates the data packet as if, for example, the corresponding software services were part of a private network of the customer.

At an act 1012, the first node 1006 encapsulates the data packet from the first container 1002. Encapsulation can be performed, for example, by the IIEM of the first node 1006, using the maintained IIRT. For example, the IIEM can use the IIRT to obtain the IP address of the second node 1008 on which the second container 1004 is executing, based on mapping maintained in the IIRT between container IP addresses of customers and node IP addresses. Similarly, the IIEM can use the IIRT to obtain the IP address of the first node 1006. As illustrated in FIG. 10, the generated encapsulation packet can therefore include the node IP addresses as source and destination, whereas the encapsulated data packet includes the container IP addresses as source and destination. The encapsulation packet can then be routed to the second node 1008 using traditional IP routing.

At an act 1014, the second node 1008 de-encapsulates the received encapsulation packet, to obtain the encapsulated data packet generated by the first container 1002. At an act 1016, the underlying data packet is routed to the second container 1004, using the destination addressing information (i.e., the IP address of the second container) included in the data packet.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

We claim:

1. A method, performed by a computing node, for establishing network routes between software services in a network, the method comprising:
   transmitting an encapsulation establishing message to a designated node, wherein:
      the encapsulation establishing message is associated with a physical IP address of the computing node,
      the encapsulation establishing message comprises an underlying establishing message that is associated with a router identifier assigned to the computing node by the designated node, and
      the underlying establishing message triggers the designated node to establish a routing relationship between the computing node and the designated node based on the router identifier assigned by the designated node;
   transmitting an encapsulation service advertising message to the designated node, wherein:
      the encapsulation service advertising message is associated with the physical IP address,
      the encapsulation service advertising message comprises an underlying service advertising message that is associated with the router identifier assigned to the computing node,
      the underlying service advertising message includes an IP address of a software service on the computing node and a first advertisement type, and
      the underlying service advertising message triggers the designated node to associate the IP address of the software service on the computing node with the router identifier assigned to the computing node based on the first advertisement type;
   transmitting an encapsulation node advertising message to the designated node, wherein:
      the encapsulation node advertising message is associated with the physical IP address,
      the encapsulation node advertising message comprises an underlying node advertising message that is associated with the router identifier assigned to the computing node,
      the underlying node advertising message includes a port IP address associated with the computing node and a second advertisement type, and
      the underlying node advertising message triggers the designated node to associate the port IP address associated with the computing node with the router identifier assigned to the computing node based on the second advertisement type;
   receiving, from the designated node, routing information for the software services in the network, wherein the routing information is based on the encapsulation establishing message, the encapsulation service advertising message, or the encapsulation node advertising message; and
   generating a routing table of routes to the software services,
      wherein the routing table comprises the routing information,
      wherein each route comprises an IP address for one of the software services, a router identifier of a node in the network, and a port IP address of the node in the network on which the software service is running.

2. The method of claim 1, wherein one or more of the encapsulation establishing message, the encapsulation service advertising message, or the encapsulation node advertising message comprise a source designation corresponding to the physical IP address of the computing node and a destination designation corresponding to a physical IP address of the designated node.

3. The method of claim 1, wherein one or more of the underlying establishing message, the underlying service advertising message, or the underlying node advertising message comprises a source designation corresponding to the router identifier assigned to the computing node and a destination designation corresponding to a router identifier of the designated node.

4. The method of claim 1, wherein a software service is included in a Linux container.

5. The method of claim 1, wherein the underlying establishing message is an Open Shortest Path First (OSPF) Hello message.

6. The method of claim 1, wherein one or more of the underlying service advertising message or the underlying node advertising message is an Open Shortest Path First (OSPF) Link-State Update message.

7. The method of claim 1, wherein each software service is associated with an area identifier, and wherein the routing table for each destination software service is additionally characterized by a corresponding area identifier.

8. The method of claim 1, wherein the underlying service advertising message is a Link State Update packet with a Link State Advertisement of type 1.

9. The method of claim 1, wherein the underlying node advertising message is a Link State Update packet with a Link State Advertisement of type 5.

10. A system for establishing network routes between software services in a network, the system comprising:
a computing node; and
at least one non-transitory memory storing instructions, which, when executed by the computing node, cause the system to:
transmit an encapsulation establishing message to a designated node, wherein:
the encapsulation establishing message is associated with a physical IP address of the computing node,
the encapsulation establishing message comprises an underlying establishing message that is associated with a router identifier assigned to the computing node by the designated node, and
the underlying establishing message triggers the designated node to establish a routing relationship between the computing node and the designated node based on the router identifier assigned by the designated node;
transmit an encapsulation service advertising message to the designated node, wherein:
the encapsulation service advertising message is associated with the physical IP address,
the encapsulation service advertising message comprises an underlying service advertising message that is associated with the router identifier assigned to the computing node,
the underlying service advertising message includes an IP address of a software service on the computing node and a first advertisement type, and
the underlying service advertising message triggers the designated node to associate the IP address of the software service on the computing node with
the router identifier assigned to the computing node based on the first advertisement type;
transmit an encapsulation node advertising message to the designated node, wherein:
the encapsulation node advertising message is associated with the physical IP address,
the encapsulation node advertising message comprises an underlying node advertising message that is associated with the router identifier assigned to the computing node,
the underlying node advertising message includes a port IP address associated with the computing node and a second advertisement type, and
the underlying node advertising message triggers the designated node to associate the port IP address associated with the computing node with the router identifier assigned to the computing node based on the second advertisement type;
receive, from the designated node, routing information for the software services in the network, wherein the routing information is based on the encapsulation establishing message, the encapsulation service advertising message, or the encapsulation node advertising message; and
generate a routing table of routes to the software services,
wherein the routing table comprises the routing information,
wherein each route comprises an IP address for one of the software services, a router identifier of a node in the network, and a port IP address of the node in the network on which the software service is running.

11. The system of claim 10, wherein one or more of the encapsulation establishing message, the encapsulation service advertising message, or the encapsulation node advertising message comprise a source designation corresponding to the physical IP address of the computing node and a destination designation corresponding to a physical IP address of the designated node.

12. The system of claim 10, wherein one or more of the underlying establishing message, the underlying service advertising message, or the underlying node advertising message comprises a source designation corresponding to the router identifier assigned to the computing node and a destination designation corresponding to a router identifier of the designated node.

13. The system of claim 10, wherein a software service is included in a Linux container.

14. The system of claim 10, wherein the underlying establishing message is an Open Shortest Path First (OSPF) Hello message.

15. The system of claim 10, wherein one or more of the underlying service advertising message or the underlying node advertising message is an Open Shortest Path First (OSPF) Link-State Update message.

16. The system of claim 10, wherein each software service is associated with an area identifier, and wherein the routing table for each destination software service is additionally characterized by a corresponding area identifier.

17. The system of claim 10, wherein the underlying service advertising message is a Link State Update packet with a Link State Advertisement of type 1.

18. The system of claim 10, wherein the underlying node advertising message is a Link State Update packet with a Link State Advertisement of type 5.

19. At least one computer-readable medium, excluding transitory signals and carrying instructions, which when executed by at least one data processor, performs a method for establishing network routes between software services in a network, the method comprising:
- transmitting an encapsulation establishing message to a designated node, wherein:
  - the encapsulation establishing message is associated with a physical IP address of a computing node,
  - the encapsulation establishing message comprises an underlying establishing message that is associated with a router identifier assigned to the computing node by the designated node, and
  - the underlying establishing message triggers the designated node to establish a routing relationship between the computing node and the designated node based on the router identifier assigned by the designated node;
- transmitting an encapsulation service advertising message to the designated node, wherein:
  - the encapsulation service advertising message is associated with the physical IP address,
  - the encapsulation service advertising message comprises an underlying service advertising message that is associated with the router identifier assigned to the computing node,
  - the underlying service advertising message includes an IP address of a software service on the computing node and a first advertisement type, and
  - the underlying service advertising message triggers the designated node to associate the IP address of the software service on the computing node with the router identifier assigned to the computing node based on the first advertisement type;
- transmitting an encapsulation node advertising message to the designated node, wherein:
  - the encapsulation node advertising message is associated with the physical IP address,
  - the encapsulation node advertising message comprises an underlying node advertising message that is associated with the router identifier assigned to the computing node,
  - the underlying node advertising message includes a port IP address associated with the computing node and a second advertisement type, and
  - the underlying node advertising message triggers the designated node to associate the port IP address associated with the computing node with the router identifier assigned to the computing node based on the second advertisement type;
- receiving, from the designated node, routing information for the software services in the network, wherein the routing information is based on the encapsulation establishing message, the encapsulation service advertising message, or the encapsulation node advertising message; and
- generating a routing table of routes to the software services,
  - wherein the routing table comprises the routing information,
  - wherein each route comprises an IP address for one of the software services, a router identifier of a node in the network, and a port IP address of the node in the network on which the software service is running.

20. The computer-readable medium of claim 19, wherein one or more of the underlying establishing message, the underlying service advertising message, or the underlying node advertising message comprises a source designation corresponding to the router identifier assigned to the computing node and a destination designation corresponding to a router identifier of the designated node.

* * * * *